June 19, 1934.  S. SANDELOWSKY ET AL  1,963,869
ARC WELDING
Original Filed March 21, 1932
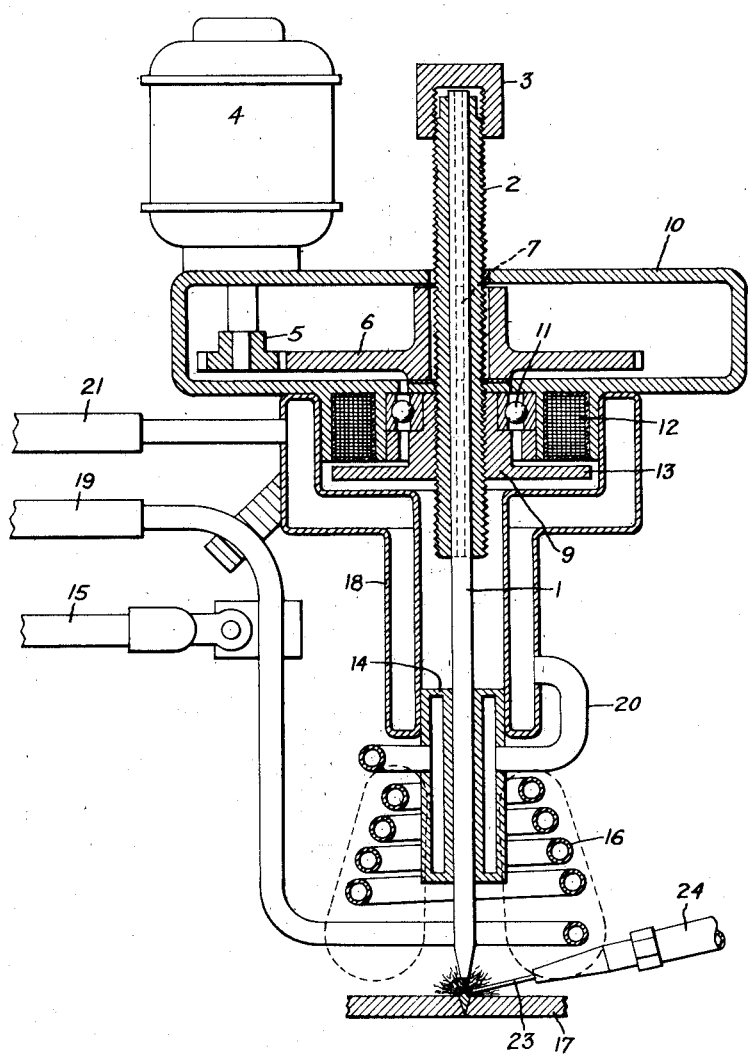
Inventors:
Sally Sandelowsky,
Karl Belling,
by Harry E. Dunham
Their Attorney.

Patented June 19, 1934

1,963,869

UNITED STATES PATENT OFFICE 1,963,869

ARC WELDING

Sally Sandelowsky, Hennigsdorf, and Karl Belling, Berlin, Germany, assignors to General Electric Company, a corporation of New York Original application March 21, 1932, Serial No. 600,340. Divided and this application November 28, 1933, Serial No. 700,130. In Germany March 26, 1931

3 Claims. (Cl. 219—8)

Our invention relates to arc welding.

It is an object of our invention to provide improved means for magnetically controlling a welding arc to steady it and prevent it from being deflected or blown out during the welding operation.

Further objects of our invention will become apparent from a consideration of the embodiment illustrated in the accompanying drawing.

The single figure of the drawing is a view partly in section of a welding head embodying our improved magnetic control as well as the electrode feeding mechanism described and claimed singly and in combination with our improved magnetic control in our application, Serial No. 600,340 for Arc welding, filed March 21, 1932, of which this application is a division.

Referring to the drawing the electrode 1 which, is preferably a carbon electrode or an electrode of the non-consuming type, is supported in a hollow screw 2 hereinafter referred to as a spindle. It is clamped in the spindle by means of a nut 3, although other means may be provided for attaching it thereto. The spindle is rotated by an electric motor 4 with which it is mechanically connected through gears 5 and 6. The connection between gear 6 and the spindle is obtained through a groove and key 7 so that the spindle is free to move through the gear but is held against rotation relative thereto. Supported on and normally rotating with the spindle is an internal screw 9 hereinafter referred to as a nut. This nut is supported in a housing 10 by means of a ball bearing 11. This housing also serves to enclose gears 5 and 6 and acts as a support for an electromagnet 12 which may, as illustrated in the figure, be formed integral therewith. Nut 9 is provided with a disk-like portion 13 located opposite to and constituting an armature for the electromagnet which is energized in accordance with a characteristic of the arc so that its energization increases and decreases with an increase or decrease in the length of the welding arc. The energization of the electromagnet may be controlled in accordance with any characteristic of the welding circuit, but is preferably controlled in accordance with the current or voltage thereof. The electromagnet may be connected directly in the welding circuit, or its energization may be controlled by means associated with the welding circuit. Such arrangements are old in the art and constitute no part of our present invention.

Current is supplied to the electrode near its arcing terminal through a hollow sleeve 14 which is connected to one terminal of a source of supply through conductors 15 and 16. Conductor 16 is preferably formed in a spiral which encloses sleeve 14 and tapers in a direction away from the arcing terminal of the electrode. The flow of current through this spiral conductor generates a powerful electric field which increases in strength upwardly due to its conical arrangement. Sleeve 14 is preferably made of magnetic material in order to concentrate the flux about the electrode. This flux has a steadying effect on the welding arc and prevents it from being deflected or blown out during the welding operation because the conical coil 16 tapers in the proper direction to exert a directing action on the arc in line with the longitudinal axis of the electrode without involving any danger of blowing out the arc due to the strong magnetic action of the coil.

Sleeve 14 and conductor 16 are preferably made hollow and cooled by circulating therethrough a suitable cooling medium such as water. A water jacket 18 is also interposed between the welding arc and the feeding mechanism in order to protect it from the heat of the arc. The cooling medium is supplied through pipe 19, conductor 16, sleeve 14, pipe 20 and jacket 18 from which it is discharged through a pipe 21. This cooling permits a compact arrangement of parts being employed as well as the location of spiral conductor 16 and sleeve 14 very close to the arcing terminal of the electrode.

Additional material may be added to the seam during welding by supplying thereto a welding wire 23 which may be automatically fed into the arc through a nozzle 24 by means of a feeding mechanism (not shown). Preferably, the nozzle 24 and the welding wire 23 are electrically insulated from the welding head and from the rest of the machine frame in order to prevent the arc from striking over to the welding wire and forming an arc between the welding wire and the electrode.

The mechanism above described operates as follows: An arc is established between the electrode 1 and the work 17 by means of a piece of carbon or the like. If the arc is of the proper length, the electromagnet 12 will not act on the armature 13 of the nut 9 and no feeding action will be obtained. The electrode, however, will be rotated at a constant rate of speed by the motor 4 and the arc at the terminal of the electrode will be stabilized by this rotation and by the magnetic influence of the field generated by the welding current flowing through spiral coil 16. If the arc length becomes too great the electromagnet 12 will be energized attracting thereto armature 13 of the nut 9 and holding it against rotation. With the nut 9 thus prevented from rotating, the spindle 2 is fed therethrough by reason of the threaded engagement of these two members. As soon as the arc length attains a normal value, the electromagnet 12 will be deenergized, again permitting nut 9 to rotate with spindle 2 and thus preventing further feeding of the electrode toward the work. It is of course apparent that rotation of the nut 9 need not be arrested since a feeding action may be obtained if its rate of rotation be decreased relative to the rate of rotation of spindle 2. Consequently, the braking effect of the magnet 12 on the disk 13 before these two members are brought into engagement will be effective and may be used for feeding the electrode toward the work.

While we have shown and described but one embodiment of our improved magnetic control, it is apparent that various modifications and variations may be made without departing from the spirit and scope thereof. It is apparent that in place of the non-consuming electrodes for which the apparatus above described is particularly suited, consuming electrodes, commonly referred to as metallic electrodes, may be used without departing from our invention.

What we claim as new and desire to secure by Letters Patent of the United States, is:

1. Arc welding apparatus comprising a sleeve of magnetic material surrounding and in contact with the welding electrode near its arcing terminal, a spiral conductor surrounding said magnetic sleeve tapering in a direction away from the arcing terminal of said electrode and having a terminal connected to said magnetic sleeve, and means for supplying welding current to said electrode through said spiral conductor and sleeve.

2. Arc welding apparatus comprising an electrode holder, a spiral conductor surrounding said electrode and tapering in a direction away from the arcing terminal thereof, means for connecting one terminal of said conductor to the electrode near its arcing terminal, and means for supplying welding current to said electrode through said spiral conductor.

3. Arc welding apparatus comprising a spiral coil surrounding the welding electrode at its arcing terminal and tapering in a direction away therefrom, and means for supplying electric current through said coil and establishing a magnetic field about said electrode.

SALLY SANDELOWSKY.
KARL BELLING.